United States Patent
Gordon (10) Patent No.: US 9,495,246 B2
(45) Date of Patent: Nov. 15, 2016

(54) RAID ERASURE CODE APPLIED TO PARTITIONED STRIPE

(71) Applicant: Kaminario Technologies Ltd., Yokne'am ILIT (IL)

(72) Inventor: Eyal Gordon, Haifa (IL)

(73) Assignee: KAMINARIO TECHNOLOGIES LTD., Yokne'am ILIT (IL)

( * ) Notice: Subject to any disclaimer, the term of this patent is extended or adjusted under 35 U.S.C. 154(b) by 287 days.

(21) Appl. No.: 13/746,055

(22) Filed: Jan. 21, 2013

(65) Prior Publication Data

US 2014/0208022 A1  Jul. 24, 2014

(51) Int. Cl.
*G06F 12/12* (2016.01)
*G06F 11/10* (2006.01)

(52) U.S. Cl.
CPC .... *G06F 11/1076* (2013.01); *G06F 2211/1057* (2013.01)

(58) Field of Classification Search
CPC .................................................. G06F 3/0689
USPC ........................................................ 711/114
See application file for complete search history.

(56) References Cited

U.S. PATENT DOCUMENTS

| | | | |
|---|---|---|---|
| 6,938,123 B2 * | 8/2005 | Willis et al. ................. | 711/114 |
| 7,356,731 B2 * | 4/2008 | Corbett et al. .............. | 714/6.21 |
| 8,245,113 B2 * | 8/2012 | Winarski et al. ............ | 714/770 |

OTHER PUBLICATIONS

Blaum, et al., "EVENODD: An efficient scheme for tolerating double disk failures in RAID architectures", IEEE Transactions in Computers, Feb. 1995, pp. 192-202, vol. 44, Issue 2.
Corbett et al., "Row-Diagonal Parity for Double Disk Failure Correction", In 3rd Usenix Conference on File and Storage Technologies, Mar. 17, 2004, San Francisco, CA.
Blaum, et al., "On Lowest Density MDS Codes", IEEE Transactions on Information Theory, Jan. 1999, pp. 46-59, vol. 45, Issue 1.
Schuman et al., "A Performance Comparison of Open-Source Erasure Coding Libraries for Storage Applications", Technical Report UT-CS-08-625, Aug. 8, 2008, Tennessee.
G. Somasundaram et al., Information Storage and Management, Glossay, p. 426, Wiley Publishing Inc., Indianapolis, IN, 2009.
Wikipedia, Erasure code, downloaded from https://en/wikipedia.org/wiki/Erasure_code, Jun. 6, 2016.

* cited by examiner

*Primary Examiner* — Jae Yu
(74) *Attorney, Agent, or Firm* — Wiggin and Dana LLP; Gregory S. Rosenblatt; Jonathan D. Hall (57) ABSTRACT

The disclosure presents examples of a RAID storage system, method and computer program product where a stripe is logically partitioned into two or more sub-stripes and at least one RAID erasure code is applied to each sub-stripe independently of any other of the sub-stripe(s). Consequently, in some of these examples, a larger packet size may be used than if the stripe had not been partitioned. A larger packet size may in some cases allow for accelerated encoding and/or decoding.

28 Claims, 4 Drawing Sheets

RAID ERASURE CODE APPLIED TO PARTITIONED STRIPE

TECHNICAL FIELD

The disclosure relates to Redundant Array of Independent Disks (RAID) storage technology.

BACKGROUND

A RAID storage system typically includes a RAID controller and a plurality of storage devices, such as disk drives. A collection of multiple same sized segments are typically although not necessarily stored on separate storage devices. The size of each segment is denoted as s. The collection of segments is called a "stripe", and the number of segments in a stripe is denoted as n. Each stripe comprises k segments of the actual data and m segment(s) of parity data (also known as redundancy data). However, for simplicity's sake the term stripe is also used to refer to the data segments in the collection, without the parity segment(s).

In several well known RAID erasure codes, to facilitate parity computation, each segment in the stripe is split into w same-size packets, whose size is denoted as x, such that $w*x=s$, where s is the segment size. Such RAID erasure codes may be used in RAID data storage. The computed parity data may be used, for instance, to recover lost data in case of failure.

In a RAID 6 protection scheme, the number of parity segments, m, is 2. The calculation of one of the parity segments, P, is typically although not necessarily based on a XOR based function with the parity segment, P, resulting from the XOR of the k data segments. The other parity segment, Q, is computed using a RAID erasure code. The type of RAID erasure code may vary depending on the implementation.

SUMMARY

In accordance with the disclosed subject matter, there is provided a system, comprising: a Redundant Array of Independent Disks, RAID, controller capable of logically partitioning a stripe into two or more sub-stripes, and of applying at least one RAID erasure code to each of the sub-stripes independently of any other of the sub-stripes.

In some examples, the system further comprises: a plurality of storage devices, wherein the RAID controller is capable of writing or reading the stripe to or from any of the plurality of storage devices.

In some examples of the system, each sub-segment associated with a same sub-stripe has identical size.

In some examples of the system, a size of a sub-segment associated with one of the sub-stripes differs from a size of a sub-segment associated with another of the sub-stripes.

In some examples of the system, two sub-segments associated with two different sub-stripes have identical size.

In some examples of the system, at least one selected from a group comprising: number of packets or size of packets, differs for different sub-stripes.

In some examples of the system, at least one selected from a group comprising: number of packets or size of packets, is identical for at least two different sub-stripes.

In some examples of the system, a size of a sub-segment associated with a sub-stripe does not equal a power of two.

In some examples of the system, a size of a sub-segment associated with a sub-stripe equals a power of two.

In some examples of the system, the RAID controller is capable of determining values of packet size and number of packets to use per sub-stripe.

In some of these examples, the RAID controller being capable of determining values of packet size and number of packets to use per sub-stripe, includes the RAID controller being capable of selecting from among available sets which each includes values for any of packet size, number of packets, or sub-segment size per sub-stripe, at least partly based on at least one factor selected from a group comprising: segment size in stripe, type of the at least one RAID erasure code, number of data segments in stripe, testing data relating to acceleration of RAID erasure code application, in-turn selection, or random selection.

In some of these examples, there is available to the RAID controller only one set including values for any of packet size, number of packets, or sub-segment size per sub-stripe, and wherein the RAID controller being capable of determining values of packet size and number of packets to use per sub-stripe, includes the RAID controller being capable of determining to use the set.

In some of these examples, the RAID controller being capable of determining values of packet size and number of packets to use per sub-stripe includes the RAID controller being capable of deriving a value of packet size or sub-segment size to use per sub-stripe from an available set corresponding to a different segment size than segment size of the stripe.

In some of these examples, being capable of determining values of packet size and number of packets to use per sub-stripe, includes the RAID controller being capable of computing a value for packet size or number of packets from an available set which includes values for sub-segment size and number of packets or packet size respectively.

In some of these examples, the RAID controller being capable of determining values of packet size and number of packets to use per sub-stripe includes the RAID controller being capable of determining values to use for decoding at least partly based on values which were used for encoding.

In some examples of the system, the RAID controller is capable of determining at least one possible set including values for any of packet size, number of packets, or sub-segment size per sub-stripe which complies with at least one predetermined constraint.

In some of these examples, the at least one predetermined constraint is selected from a group comprising: number of packets per sub-segment of sub-stripe is greater than or equal to number of data segments, number of packets per sub-segment of sub-stripe is greater than or equal to number of data segments minus 1, number of packets per sub-segment of sub-stripe is equal to a prime number minus 1, packet size per sub-stripe is equal to a power of 2, or sum of sub-stripe sub-segment sizes is equal to stripe segment size.

In some examples of the system, the RAID controller being capable of applying at least one RAID erasure code includes the RAID controller being capable of encoding the sub-stripe in order to compute at least one parity sub-segment.

In some examples of the system, the RAID controller being capable of applying at least one RAID erasure code includes the RAID controller being capable of decoding at least one parity sub-segment in the sub-stripe.

In some examples of the system, the RAID controller being capable of applying at least one RAID erasure code includes the RAID controller being capable of applying different RAID erasure codes to different ones of the sub-stripes.

In accordance with the disclosed subject matter, there is also provided a method performed by a Redundant Array of Independent Disks, RAID, controller, comprising: logically partitioning a stripe into two or more sub-stripes, and applying at least one RAID erasure code to each of the sub-stripes independently of any other of the sub-stripes.

In some examples of the method, the applying includes encoding the sub-stripe in order to compute at least one parity sub-segment.

In some examples of the method, the applying includes decoding at least one parity sub-segment in the sub-stripe.

In some examples, the method further comprises: determining values of packet size and number of packets to use per sub-stripe.

In some examples, the method further comprises: determining at least one possible set including values for any of packet size, number of packets or sub-segment size per sub-stripe which complies with at least one predetermined constraint.

In some examples, the method further comprises: reading the stripe from storage devices prior to the partitioning.

In some examples, the method further comprises: writing the stripe to storage devices after the applying.

In accordance with the disclosed subject matter, there is further provided a computer program product comprising a non-transitory computer readable medium having Redundant Array of Independent Disks, RAID computer readable program code embodied therein the computer program product comprising: computer readable program code for causing a computer to logically partition a stripe into two or more sub-stripes, and computer readable program code for causing a computer to apply at least one RAID erasure code to each of the sub-stripes independently of any other of the sub-stripes.

BRIEF DESCRIPTION OF THE DRAWINGS

In order to understand the subject matter and to see how it may be carried out in practice, non-limiting examples will be described, with reference to the accompanying drawings, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical or analogous elements.

DETAILED DESCRIPTION OF THE DRAWINGS

Described herein are some examples of a RAID storage system, method and computer program product where a stripe is logically partitioned into two or more sub-stripes and at least one RAID erasure code is applied to each sub-stripe independently of any other of the sub-stripes.

In some examples described herein, for simplicity's sake, the term "application" or "application of RAID erasure code", or variants thereof may be used to refer to encoding, to decoding, to either encoding or decoding, and/or to both encoding and decoding, as appropriate.

In various examples described herein, for simplicity's sake, the same term stripe is used to refer to a collection of segments which include both data and parity segments, and/or to refer to a collection of data segments without parity segment(s) (for instance because the parity segment(s) have not yet been computed).

In the following detailed description, numerous specific details are set forth in order to provide a thorough understanding of the subject matter. However, it will be understood by those skilled in the art that some examples of the subject matter may be practiced without these specific details. In other instances, well-known features, structures, characteristics, stages, methods, modules, elements, and systems have not been described in detail so as not to obscure the subject matter.

Usage in the specification of the term "for example," "such as", "for instance", "e.g.", "possibly", "it is possible", "optionally", "say", "one example", "illustrated example", "some examples", "another example", "other examples", "various examples", "one instance", "some instances", "another instance", "other instances", "one case", "some cases", "another case", "other cases" or variants thereof means that a particular described feature, structure, characteristic, stage, method, module, element, or system is included in at least one non-limiting example of the subject matter, but not necessarily in all examples. The appearance of the same term does not necessarily refer to the same example(s).

The term "illustrated example", is used to direct the attention of the reader to one or more of the figures, but should not be construed as necessarily favoring any example over any other.

Usage in the specification of conditional language, such as "may", "can", "could", or variants thereof is intended to convey that one or more examples of the subject matter may include, while one or more other examples of the subject matter may not necessarily include, certain features, structures, characteristics, stages, methods, modules, elements, and/or systems. Thus such conditional language is not generally intended to imply that a particular described feature, structure, characteristic, stage, method, module, element, or system is necessarily included in all examples of the subject matter.

It should be appreciated that certain features, structures, characteristics, stages, methods, modules, elements, and/or systems disclosed herein, which are, for clarity, described in the context of separate examples, may also be provided in combination in a single example. Conversely, various features, structures, characteristics, stages, methods, modules, elements, and/or systems disclosed herein, which are, for brevity, described in the context of a single example, may also be provided separately or in any suitable sub-combination.

Unless specifically stated otherwise, as apparent from the following discussion, it is appreciated terms such as "providing", "being provided with", "partitioning", "applying", "executing", "repeating", "performing", "writing", "reading", "determining", "selecting", "using", "encoding", "decoding", "testing", or the like, may refer to the action(s) and/or process(es) of any combination of software, hardware and/or firmware. For example, these terms may refer in some cases to the action(s) and/or process(es) of one or more RAID controller(s). The term "RAID controller" as used herein may refer to a hardware RAID controller; or to a firmware/driver based and/or software RAID controller plus the appropriate hardware to run the program code; or to a combination thereof.

In a RAID storage system that is known in the art the segment size, s, may be uniform for all stripes. For instance, the segment size, s, may be dependent on the storage system's input/output granularity size and may therefore be equal to a power of 2. In this instance, $s=2^r$ where r is any appropriate number. In some examples, there may be a relatively large number of separate storage devices (e.g. disk drives) in the storage system so that the number of data segments, k, may be set at a relatively high number in order to reduce relatively the overhead used for storing parity segment(s). It should be understood that assuming that the number of parity segment(s) is the same regardless of the number of data segments, there would be less overhead if there were a larger number of data segments than if there were a smaller number of data segments.

It is noted that in certain RAID erasure codes, due to alignment considerations in a computer architecture, the application of the RAID erasure code may be faster when the packet size, x, is a power of 2 and the packet size, x, is greater than or equal to the integer size of the storage system. (The integer size of the storage system is typically although not necessarily 4 or 8 bytes). In other words, the packet size may be constrained by the computer architecture.

If both s and x are numbers that equal a (different) power of 2, then since w*x=s, the number of packets, w, would also be constrained to be a number that equals a power of 2. This constraint, as well as one or more other constraints relating to various RAID erasure codes (discussed in the next few paragraphs), may limit the possible values of w.

In certain RAID erasure codes, the value of w(=number of packets) is affected by the value of k (=number of data segments) such that if k is higher, w is also necessarily higher. For instance, in some RAID erasure codes, such as EvenOdd, w must be a number such that k<=w+1, whereas in some RAID erasure codes, such as Row Diagonal Parity (RDP) and Blaum-Roth, w must be a number such that k<=w. With regard to EvenOdd, see for example Blaum, M., Brady, J., Bruck, J. and Menon, J. EVENODD: An Efficient Scheme for Tolerating Double Disk Failures in RAID Architectures; IEEE Transactions on Computing 44, 2 (February 1995), 192-202. With regard to Row Diagonal Parity, see for example Corbett, P., English, B., Goel, A. Grcanac, T., Kleiman, S., Leong, J., and Sankar, S: Row Diagonal Parity for Double Disk Failure Correction; in Third USENIX Conference on File and Storage Technologies (San Francisco, Calif., Mar. 31-Apr. 2, 2004). With regard to Blaum-Roth, see for example Blaum, M., and Roth, R. M: On Lowest Density MDS Codes; IEEE Transactions on Information Theory 45, 1 (January 1999), 46-59.

Since w*x=s, for a given segment size, s, the more packets in a segment, w, the smaller the size of each packet, x.

However, a smaller packet size x may result for certain RAID erasure codes in a slower application than a higher packet size. Therefore, in RAID erasure code application as known in the art, the desire for a lower overhead and the desire for a higher speed may be conflicting goals.

In some RAID erasure codes, such as EvenOdd, Row Diagonal Parity and Blaum-Roth family of codes, there may be a constraint that w must be a number such that w+1 is a prime number.

Figure 1:
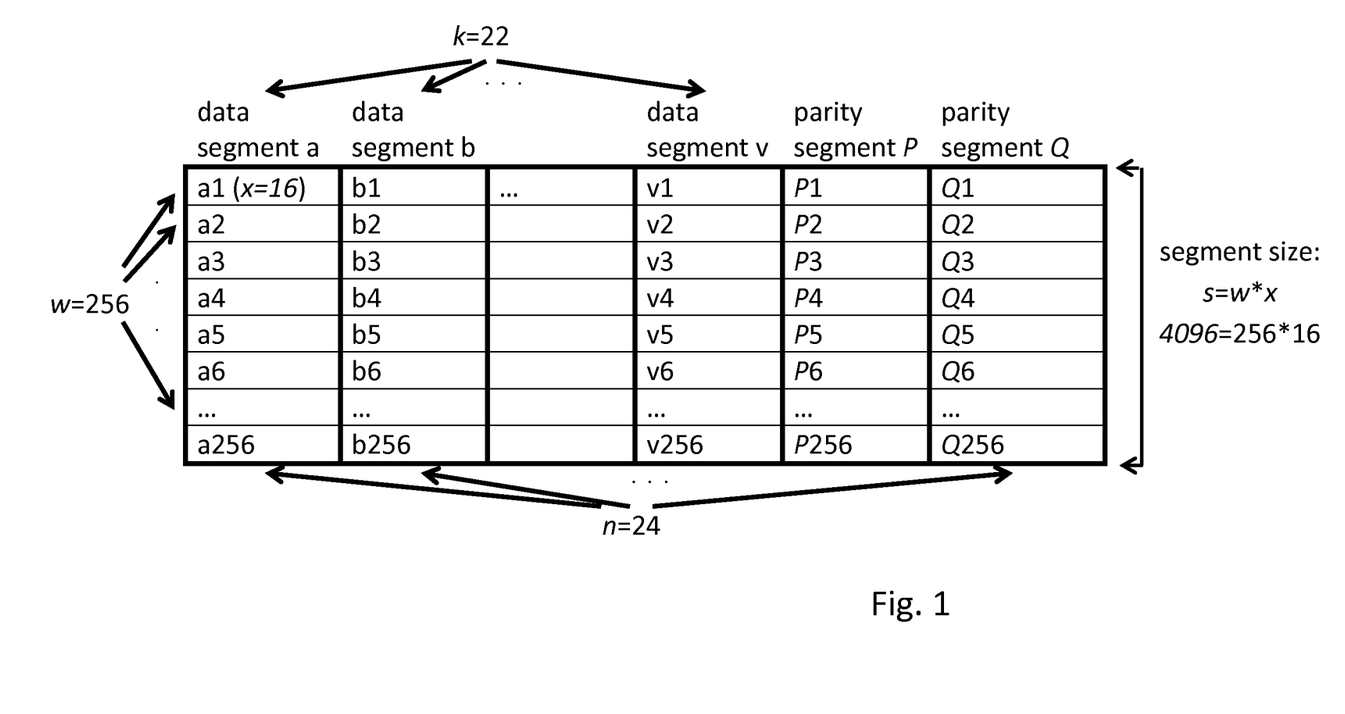
FIG. 1 illustrates an example of a RAID 6 layout as known in the art.

Refer to FIG. 1 which illustrates an example of a RAID 6 layout as known in the art. In the illustrated example, the segment size s is assumed to be 4096 bytes (i.e. 4 KB); the number of segments, n, is assumed to be 24; the number of data segments, k, is assumed to be 22; and the number of parity segments, m, is assumed to be 2.

It is noted that for a k which is equal to or greater than 18, if there is a constraint that k<=w+1 then w must be equal to or greater than 17. If there is a constraint that k<=w, then w must be equal to or greater than 18. If there is a constraint that the packet size, x, must be a power of 2 and that the packet size, x, must be greater than or equal to the integer size of the storage system (the integer size of the storage system typically although not necessarily being 4 or 8 bytes), then the number of packets, w, must be a value which is equal to a power of 2. There may be a constraint that w+1 must be a prime number. Therefore assuming it is desirable to have as high a packet size x as possible, the minimum value w which satisfies all of the constraints noted in this paragraph is selected in this example, the minimum value being w=256. In this case, since x=s/w=4096/256 the packet size x is 16 bytes.

It is noted that 16 bytes is a relatively small packet size which as mentioned above may result for certain RAID erasure codes in a slower application compared to a larger packet size.

Figure 2:
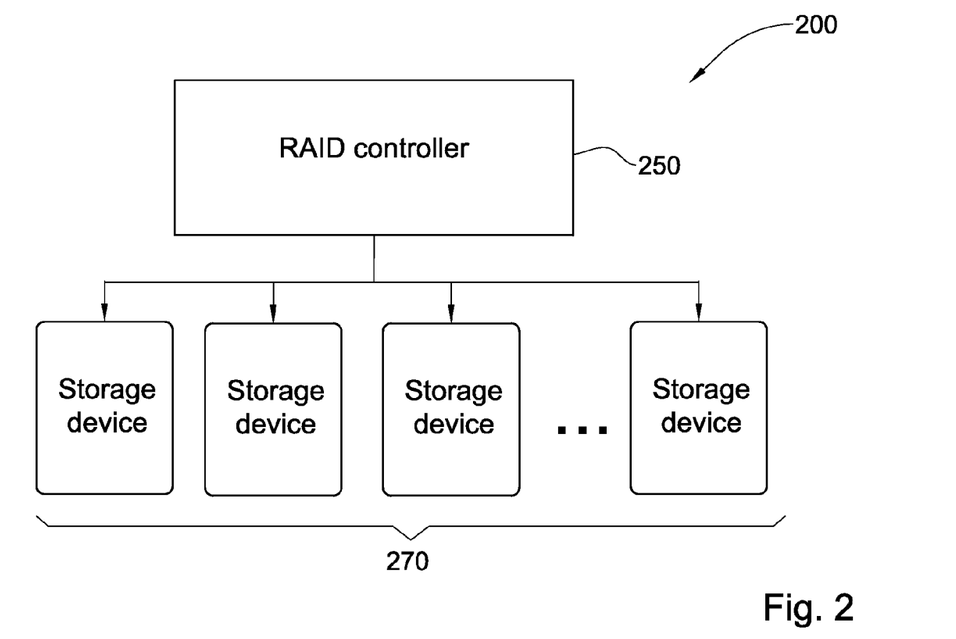
FIG. 2 is a block diagram illustrating an example of a RAID storage system, in accordance with the currently disclosed subject matter.

FIG. 2 is a block diagram illustrating an example of a RAID storage system 200, in accordance with the currently disclosed subject matter.

In the illustrated example, RAID storage system 200 includes a RAID controller 250 and a plurality of storage devices 270.

Depending on the example, one or more of storage devices 270 may be locally connected to RAID controller 250, and/or one or more of storage devices 270 may be remotely connected to RAID controller 250.

The disclosure does not limit the type(s) of storage devices 270. In some examples storage devices 270 may include one or more disk drives, but this is not necessary true in all examples. In some examples, there may be a relatively large number of storage devices 270 so that the number of data segments, k, may be set at a relatively high number in order to reduce relatively the overhead used for storing parity segments, but this is not necessarily true in all examples.

As in the conventional art, RAID controller 250 is configured to handle a stripe which typically although not necessarily includes segments of a uniform segment size. For instance, the segment size may be related to input/output granularity size of storage system 200 and may therefore be equal to a power of 2, i.e. $s=2^r$ where r is any appropriate number. Handling the stripe may include being provided with the stripe. RAID controller 250 may be provided with the stripe in any appropriate manner. For example, the stripe may be received from a source internal to storage system 200 (e.g. read from storage devices 270) or from a source external to storage system 200. Handling the stripe may additionally or alternatively include handling the stripe after the encoding or decoding in any appropriate manner. For instance, the stripe may be written to storage devices 270, may be discarded, may be transferred outside of storage system 200, etc.

However, in storage system 200 of the currently disclosed subject matter, RAID controller 250 is also configured to logically partition each stripe into two or more sub-stripes. Consequently each segment in the stripe is logically partitioned into two or more sub-segments. RAID controller 250 is further configured to apply at least one RAID erasure code to each sub-stripe independently of any other of the sub-stripes. Depending on the example, application of at least one RAID erasure code may refer to encoding, for instance in order to compute one or more parity segments, may refer to decoding, for instance of one or more parity segments, may refer to either, and/or may refer to both.

The term "partition", "partitioning" or variants thereof or "logical partition", "logical partitioning" or variants thereof refers to a logical partition, which enables each partition (e.g. each sub-stripe) to be handled as an independent logical unit for at least one task (e.g. RAID erasure code application).

Depending on the example, the determination of possible set(s) of values for sub-stripes may be made by RAID controller 250, and/or may be made externally to RAID controller 250. If at least part of the determination is made by RAID controller 250, then RAID controller 250 may also be configured to determine such set(s) of values, or to perform at least part of the determination.

Figure 3:
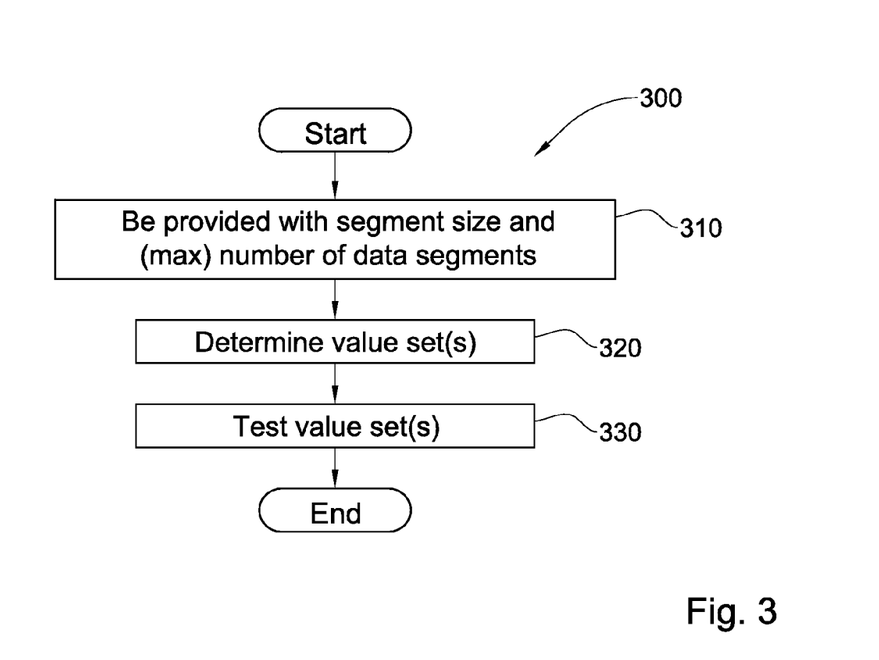
FIG. 3 is a flowchart illustrating an example of a method of determining possible set(s) of values for sub-stripes, in accordance with the currently disclosed subject matter.

FIG. 3 is a flowchart illustrating an example of a method 300 of determining possible set(s) of values for sub-stripes, in accordance with the currently disclosed subject matter.

For instance, possible values of sub-segment size, packet size, and/or number of packets, for each sub-stripe, may be determined. A possible set of values may be considered to comprise for each sub-stripe at least two of the values of sub-segment size, packet size and number of packets (since the third may be determined from the other two). Depending on the example, one or more possible sets of values may be determined.

In some examples, at least part of method 300 may be performed by RAID controller 250, in relation to an instance of encoding or decoding, such as in real time prior to encoding or decoding. In some other examples, at least part of method 300 may be performed by RAID controller independently of any instance of encoding or decoding. In still other examples, method 300 may be performed externally to RAID controller 250, for instance manually and/or by a computer. In these latter other examples, at least one of the possible set(s) of values determined by method 300 may be received by RAID controller 250 at any appropriate time, e.g. when the RAID controller is being programmed (i.e. the values may be programmed for RAID controller 250) and/or at a different time.

Depending on the example, RAID controller 250 may determine possible set(s) of values or receive possible set(s) of values once, with the same set(s) of values being available to RAID controller 250 during the entire lifetime of RAID controller 250, or RAID controller 250 may determine possible set(s) of values or receive possible set(s) of values more than once, meaning that available set(s) of values may vary during the lifetime of RAID controller 250.

Depending on the example, there may be one or more determined possible sets of values which correspond to a particular RAID erasure code. Depending on the example, the determined possible set(s) of values which correspond to various RAID erasure codes may be the same regardless of the RAID erasure code and/or may vary depending on the RAID erasure code. For instance, in the former example, the values of any set may take into account the constraint(s) relevant to any of a plurality of RAID erasure codes (where the plurality of RAID erasure codes may comprise e.g. all known RAID erasure codes or e.g. a subset of all known RAID erasure codes, or e.g. RAID erasure codes which a particular implementation of RAID controller 250 may perform, etc.), whereas in the latter example, the values may take into account the constraint(s) relevant to a particular RAID erasure code.

Depending on the example, a determined possible set of values may or may not comply with any of the following constraints, namely: for a given sub-stripe the number of packets, w, is greater than or equal to the number of data segments, k; for a given sub-stripe the number of packets, w, is greater than or equal to the number of data segments, k, minus 1; for a given sub-stripe, the number of packets, w, is equal to a prime number minus 1; for a given sub-stripe the packet size, x, is equal to a power of 2; or the sum of sub-segment sizes associated with the sub-stripes is equal to the segment size for the stripe.

For simplicity of description, it is assumed that possible set(s) determined in method 300 comply with the constraints noted in the previous paragraph. Collectively, these constraints may be relevant to a plurality of RAID erasure codes such as EvenOdd, Row Diagonal Parity, Blaum-Roth, RAID erasure codes without constraints on values of w and x, and/or RAID erasure codes with constraint(s) that are inherently complied with if the above constraints are complied with, etc.

In the illustrated example, in stage 310, segment size, s, and number of data segments or maximum number of data segments, k, are provided for a stripe. Depending on the example, more than one possible value for each of s and k may be provided, or only one value for each may be provided. In some examples, instead of the value of k, the value of n (number of segments or maximum number of segments) may be provided if the value of m (number of parity segments) is known or also provided.

As noted above, method 300 may be performed in relation to, or independently of, an instance of encoding or decoding. Therefore, depending on the example, the stripe may be an actual stripe or a potential stripe. As the minimum value of w is constrained by the value of k, k in method 300 may represent the number of data segments or the maximum number of data segments depending on the example.

The values of s, and k may be provided in any appropriate manner. For instance, the values of s and k may be determined, e.g. for an actual stripe, or for instance, the values of s and k may be received.

In the illustrated example, in stage 320, for each group of provided values of s and k, one or more possible sets of values are determined. A possible set of values may be considered to include, for each sub-stripe, values for at least two of sub-segment size, packet size or number of packets (since the third may be determined from the other two). It is noted that for different sub-stripes, not necessarily the same two need be provided.

For instance, different possible sets of values may be generated using the following algorithm:

For y=1 to L, try all possible combinations of $w_1, x_1, \ldots, w_y, x_y$, where each of the w values is a prime number minus 1, is greater than k and is not greater than s, where each x value is a power of 2 and is not greater than s, and where $s=w_1 x_1 + \ldots + w_y x_y$.

In the above algorithm, depending on the example, L may be a predefined number, for instance equivalent to the segment size, s, or L may be determined during algorithm execution, for instance determined to be equivalent to the highest number of sub-stripes for which a set of values is found. (In the latter instance, if for a particular number of sub-stripes, no set of values which satisfy the limitations of the algorithm is found, then the algorithm may not check for any higher number of sub-stripes.)

The subject matter is not bound by the algorithm written above, and in other examples other algorithms may be used additionally or alternatively in order to determine possible value set(s).

Assume, for the purpose of illustration only, that the following possible sets of values (numbered 1 through 9 in Table 1 below) are obtained for a stripe with segments of segment size s=4096 bytes, where the number of sub-stripes may be two or three. Note that the sets shown in Table 1 are not necessarily all of the possible sets that may be obtained. In Table 1, s1, w1, x1 are the segment size, number of packets, and packet size respectively in one sub-stripe of a stripe; s2, w2, x2 are the segment size, number of packets, and packet size respectively in another sub-stripe of the stripe; and s3, w3, x3 are the segment size, number of packets, and packet size respectively in yet another sub-stripe of the stripe, when such a sub-stripe exists. In sets 1 to 8 there are two sub-stripes (and therefore in Table 1, s3, w3 and x3 are noted as not applicable, N/A, for these sets), and in set 9 there are three sub-stripes.

TABLE 1

Possible sets of values for a stripe with segment size of 4096 bytes.

| No. | s | s1 | w1 | x1 | s2 | w2 | x2 | s3 | w3 | x3 |
|---|---|---|---|---|---|---|---|---|---|---|
| 1 | 4096 | 1792 | 28 | 64 | 2304 | 36 | 64 | N/A | N/A | N/A |
| 2 | 4096 | 1408 | 22 | 64 | 2688 | 42 | 64 | N/A | N/A | N/A |
| 3 | 4096 | 1152 | 18 | 64 | 2944 | 46 | 64 | N/A | N/A | N/A |
| 4 | 4096 | 704 | 22 | 32 | 3392 | 106 | 32 | N/A | N/A | N/A |
| 5 | 4096 | 896 | 28 | 32 | 3200 | 100 | 32 | N/A | N/A | N/A |
| 6 | 4096 | 1280 | 40 | 32 | 2816 | 88 | 32 | N/A | N/A | N/A |
| 7 | 4096 | 1472 | 46 | 32 | 2624 | 82 | 32 | N/A | N/A | N/A |
| 8 | 4096 | 1856 | 58 | 32 | 2240 | 70 | 32 | N/A | N/A | N/A |
| 9 | 4096 | 1792 | 28 | 64 | 1152 | 18 | 64 | 1152 | 18 | 64 |

It is noted that the packet size (x1, x2, x3) in each of the sets listed in Table 1 for a partitioned stripe is larger than 16 bytes. Referring again to FIG. 1, 16 bytes was the packet size used when a RAID erasure code was applied to the stripe as a whole, for the same segment size of 4096 bytes. It is noted that a higher packet size than 16 bytes (as in Table 1) may allow for a faster application of a RAID erasure code in at least certain cases than a packet size of 16 bytes (as in FIG. 1).

Assume further, that it is desirable to additionally or alternatively determine possible sets of values in the case of a stripe with segments of a segment size that is larger or smaller than 4096 bytes. In this case, the algorithm described above may be applied again, or a different algorithm may be applied, for the higher or lower segment size. Alternatively, the resulting values of sub-stripe packet size ($x_1 \ldots x_y$) and/or sub-segment size ($s_1 \ldots s_y$) for a segment size s which is larger or smaller than 4096 bytes may be derived by multiplying the packet size values and/or sub-segment size values for segment size 4096 bytes by the coefficient s/4096. See Appendix A which shows the same possible sets of values corresponding to segment size s=4096 that are shown in Table 1, as well as some possible sets of values corresponding to higher and lower values of s which are powers of 2, where these sets may be derived for example by multiplying values of $x_1 \ldots x_y$ (and associated sub-segment sizes $s_1 \ldots s_y$) for segment size 4096 bytes by the coefficient s/4096.

The possible sets of values shown in Table 1 (above) and in Appendix A are provided for the purpose of illustration only, and in other examples more, fewer and/or different possible sets of values may be determined.

Referring to Table 1 above and Appendix A, it is noted that the size of each sub-segment associated with the same sub-stripe is the same. This property is referred to herein as the "horizontal property". However, sub-segments associated with different sub-stripes of a stripe are not necessarily the same size. This property is referred to herein as the "non-uniformity property".

Mathematically the two properties may be represented as follows:

The horizontal property of the partitioning means that for each i between 1 and z (where z is the number of sub-stripes), the size of the i'th sub-segment (associated with the i'th sub-stripe) is identical for all sub-segments associated with the same sub-stripe, and is denoted as s_i.

The non-uniform property of the partitioning means that within a segment which is partitioned into z sub-stripes, for each i, j between 1 and z, s_i (the size of the i'th sub-segment, associated with the i'th sub-stripe) does not need to be equal to s_j (the size of the j'th sub-segment, associated with the j'th sub-stripe).

It is noted that $s\_1 + \ldots + s\_z = s$ (where s is the total segment size)

Referring to Table 1 above and Appendix A, it is also noted that for each sub-stripe, the values of number of packets (w) and packet size (x) for that sub-stripe comply with the constraints discussed above.

Referring to Table 1 above and Appendix A it is further noted that although the sum of the sizes of sub-stripe sub-segments is equal to the size of the stripe segment which is typically although not necessarily equal to a power of 2 due to a constraint of storage system 200 as discussed above, the sub-segment size in each sub-stripe may or may not be equal to a power of 2, and therefore there is typically, although not necessarily, more choice in possible sub-segment sizes compared to the choice in possible segment size. Moreover, although the size of a segment in a stripe is typically, although not necessarily, uniform as discussed above, the sizes of the sub-segments in different sub-stripes may or may not be uniform, as stated in the non-uniformity principle, therefore typically, although not necessarily, allowing more choice in possible sub-segment sizes compared to the choice in possible segment size. Consequently, there may be added flexibility in choosing the values of w and x for a sub-stripe when a RAID erasure code is applied independently to the sub-stripe, compared to a situation where a RAID erasure code is applied to the stripe as a whole. For instance, when at least one RAID erasure code is applied to each sub-stripe independently of any other sub-stripe, w*x (i.e. the sub-segment size) may or may not be the same for each sub-stripe, w and/or x for each sub-stripe may or may not be the same as for each other sub-stripe, and/or w for each sub-stripe may or may not be a power of 2 (since w*x may or may not be a power of 2). In some cases, the added flexibility may allow for a larger packet size, x, and possibly an accelerated encoding and/or decoding, when a RAID erasure code is applied to each sub-stripe independently of any other sub-stripe compared to when a RAID erasure code is applied to the stripe as a whole.

Although the sets of values shown in Table 1 and Appendix A are relevant to a plurality of RAID erasure codes, it is possible that one or more sets of values may not be relevant to a certain current or future RAID erasure code, due to one or more constraints of this erasure code with which the values do not comply. It should be evident to the reader, that additional, fewer and/or different sets of values than those presented in Table 1 or Appendix A may be determined which are relevant to the certain RAID erasure code, in a manner similar to what was described herein, mutatis mutandis.

Figure 4:
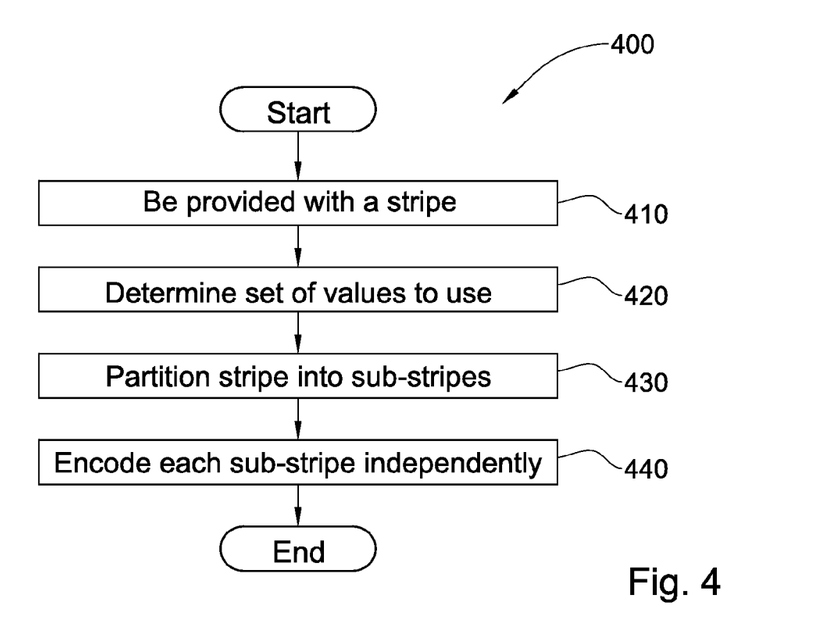
FIG. 4 is a flowchart illustrating an example of a method of RAID encoding, in accordance with the currently disclosed subject matter.
Figure 5:
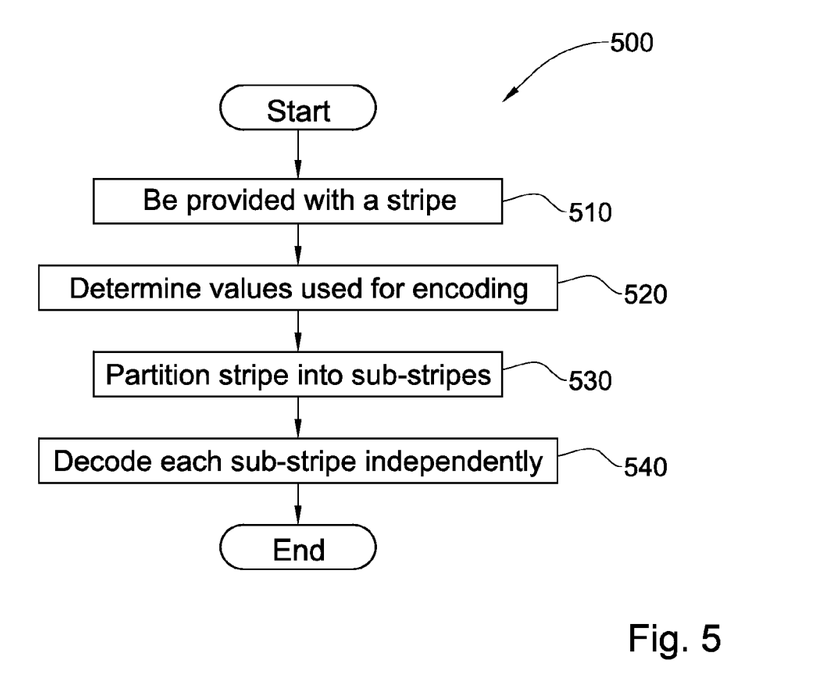
FIG. 5 is a flowchart illustrating an example of a method of RAID decoding, in accordance with the currently disclosed subject matter.

Although a plurality of sets of values are shown in Table 1 and Appendix A, this should not be considered limiting. In some examples only one possible set of values may be determined in stage 320 for use in method 400 and/or 500.

The subject matter is not bound by the constraints discussed herein, and in some other examples there may be fewer, more and/or different constraint(s) with which at least one set of values may comply.

In the illustrated example in optional stage 330, various possible sets of values may be tested in order to determine which set(s) would accelerate the RAID erasure code application (e.g. encoding and/or decoding) the most, either for any RAID erasure code or per RAID erasure code. For instance, one or more possible set(s) of values which accelerate the RAID erasure code application the most may be retained for use in method 400 and/or 500 with the others discarded, or the set(s) which accelerate the RAID erasure code application the most may be noted as such, so that RAID controller 250 may consider the testing data relating to acceleration of RAID erasure code application for that/those set(s), when determining which set(s) to use in RAID erasure code application (although RAID controller 250 may not necessarily use a set that was noted as more accelerating).

In some examples, stage 330 may alternatively be omitted.

In the illustrated example, method 300 then ends.

FIG. 4 is a flowchart illustrating an example of a method of RAID encoding, in accordance with the currently disclosed subject matter.

In the illustrated example in stage 410, RAID controller 250 is provided with a stripe. The disclosure does not limit how the stripe is provided, and the stripe may be provided in any appropriate way. For instance, the stripe may be received from a source internal to storage system 200 (e.g. read from storage devices 270) or from a source external to storage system 200.

In the illustrated example in stage 420, RAID controller 250 determines a set of values to use when encoding the sub-stripes.

In some examples, RAID controller 250 may have available one value set which was determined in method 300 so that no selection is required and RAID controller 250 determines to use that set.

Alternatively, in some examples, RAID controller 250 may have available various possible sets of values determined in method 300 so that selection from among the available sets is required. Depending on the example, the selection may take into account one or more factors. Examples of possible factors may include the segment size in the stripe, the type(s) of RAID erasure code(s) being applied (which may or may not be the same for each sub-stripe), the number of data segments in the stripe, testing data (e.g. from stage 330) relating to acceleration of RAID erasure code application, in turn selection and/or random selection, etc. For instance, if either or both stripe segment size, s, and number of data segments, k, may take on various values for various possible stripes which may be provided to RAID controller 250 and/or the RAID erasure code(s) which may be applied may vary for various possible stripes that may be provided to RAID controller 250, then RAID controller 250 may select a set of values for the sub-stripes which is valid for the current values of s and k and/or the RAID erasure code(s) which will be applied. Continuing with this instance, the number of packets, w, for each sub-stripe may be constrained by $k \leq w+1$ or by $k \leq w$ for various RAID erasure code(s), the values of w and/or packet size, x, for each sub-stripe may vary depending on the current value of s, etc. Therefore, the selected set may vary depending on the provided stripe. Selection may additionally or alternatively take into account, for instance, testing data relating to acceleration of RAID erasure code application for various possible sets when selecting a set. In this instance, selection may take into account that a set of values when tested led to accelerated RAID erasure code application compared to other tested sets. Additionally or alternatively, for instance, selection may be random or in turn (e.g. round-robin). In this instance, if more than one possible set may be selected, without taking into account any other factor, or after taking into account one or more other factors, then the set may be selected randomly or the set whose turn it is to be selected may be selected.

Additionally or alternatively, for instance, in order to determine a set to use, RAID controller 250 may derive a set of values corresponding to the current stripe segment size from an available set of values corresponding to a different stripe segment size, for instance by multiplying the sub-segment size s and packet size, x, for each sub-stripe of the different stripe by a coefficient equal to the current segment size/different segment size in order to derive the sub-segment size s and packet size, x, for each sub-stripe of the current stripe.

Additionally or alternatively, for instance, RAID controller 250 may compute certain values. For instance, if RAID controller 250 has a set available which includes sub-segment sizes and number of packets or size of packets, then RAID controller 250 may compute the corresponding size of packets or number of packets using the equation $s=w*x$.

The set of values which RAID controller 250 determines to use may be, for instance, any of the sets shown in Table 1 above or in Appendix A, or may be a different set of values.

In the illustrated example, in stage 430, RAID controller 250 logically partitions a stripe into two or more sub-stripes in accordance with the set of values which was determined to be used in stage 420.

In the illustrated example in stage 440, RAID controller 250 encodes each sub-stripe independently of any other sub-stripe in order to compute at least one parity sub-segment corresponding to the sub-stripe. Depending on the example, the same RAID erasure code(s) may be applied to each sub-stripe or not necessarily.

It is noted that the partitioning of the stripe results in a different conception by RAID controller 250 of the logical unit with regard to the encoding. Without the partitioning, RAID controller 250 would have related to the stripe as one logical unit when encoding. After the partitioning, at least with respect to encoding, RAID controller relates to each sub-stripe as an independent logical unit, so that each sub-stripe is encoded independently.

The encoding of each of the sub-stripes may occur sequentially, or there may be an overlap in time between the encoding of one sub-stripe and the encoding of one or more other sub-stripes.

The disclosure does not limit how the stripe is handled after the encoding, and the stripe may be handled in any appropriate way. For instance, the stripe may be written to storage devices 270, may be discarded, may be transferred outside of storage system 200, etc.

FIG. 5 is a flowchart illustrating an example of a method of RAID decoding, in accordance with the currently disclosed subject matter.

In the illustrated example in stage 510, RAID controller 250 is provided with a stripe. The disclosure does not limit how the stripe is provided, and the stripe may be provided in any appropriate way. For instance, the stripe may be received from a source internal to storage system 200 (e.g. read from storage devices 270) or from a source external to storage system 200.

In the illustrated example in stage 520, RAID controller 250 determines which values were used for encoding the sub-stripes, so that RAID controller 250 may determine to use values for decoding (e.g. values of packet size, number of packets and/or sub-segment size for each sub-stripe) which are at least partly based on values which were used for encoding. For instance, RAID controller 250 may determine to use the same values for decoding that were used for encoding. Depending on the example, RAID controller 250 may know which values were used for the encoding, in any appropriate manner. For instance, RAID controller 250 may perform certain operations in the same manner as performed by this RAID controller or a different RAID controller prior to encoding, in order to determine the values which were used for encoding. For instance, any of the stages of method 300 and/or 400 may be performed by RAID controller 250 in the same manner as the stage(s) was/were performed prior to encoding in order to determine which values were used for encoding. Additionally or alternatively, RAID controller 250 may have been configured (e.g. programmed) to decode using the same values which were used in the encoding.

In the illustrated example, in stage 530, RAID controller 250 logically partitions the stripe into two or more sub-stripes in accordance with the values determined in stage 520.

In the illustrated example in stage 540 RAID controller 250 decodes one or more parity sub-segment(s) of each sub-stripe independently of the decoding of parity sub-segment(s) of any other sub-stripe.

It is noted that since the encoding was performed for each sub-stripe independently, as a logical unit, the decoding may also be performed for each sub-stripe independently.

The decoding for each of the sub-stripes may occur sequentially, or there may be an overlap in time between the decoding for one sub-stripe and the decoding for one or more other sub-stripes.

The disclosure does not limit the handling of the stripe after the decoding and the stripe may be handled in any appropriate way. For instance, the stripe may be transferred outside storage system 200, written to storage devices 270, discarded, etc.

Alternatively to any of the examples shown in FIGS. 3, 4 and/or 5, stages which are shown in a figure as being executed sequentially may in some other examples be executed in parallel. Alternatively to any of the examples illustrated in FIGS. 3, 4 and/or 5, any of methods 300, 400, and/or 500 may in some other examples include more, fewer and/or different stages than illustrated. Alternatively to any of the examples illustrated in FIGS. 3, 4 and/or 5, stages may in some other examples be executed in a different order than illustrated in FIGS. 3, 4 and/or 5.

Figure 6:
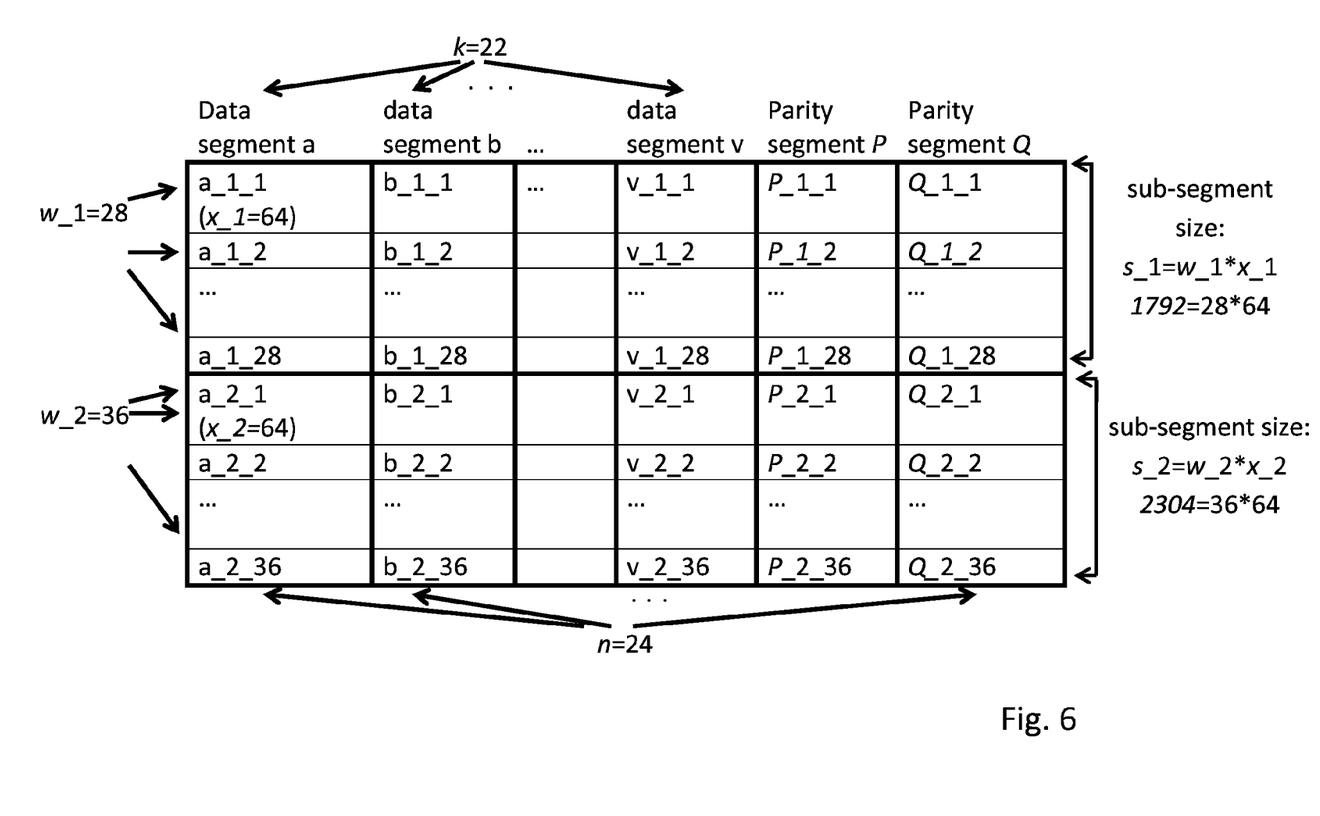
FIG. 6 illustrates an example of a RAID 6 layout, in accordance with the currently disclosed subject matter.

FIG. 6 illustrates an example of a RAID 6 layout, in accordance with the currently disclosed subject matter.

In the illustrated example it is assumed that a stripe comprises k=22 data segments and m=2 parity segments (total of n=24 segments), where the size of each segment is 4096 bytes (4 Kb). The stripe is divided into two sub-stripes, using the values of set 1 corresponding to stripe segment size 4096 (as shown in Table 1 or Appendix A).

The subject matter is not bound by the layout shown in FIG. 6 and depending on the example, any other appropriate stripe, any other appropriate RAID storage protection scheme (not necessarily RAID 6), and/or any other appropriate set of values may be used to generate a layout within the scope of the currently disclosed subject matter.

In some examples, RAID erasure encoding and/or RAID erasure decoding may be accelerated using any of the methods (or part thereof) and/or systems (and/or part thereof) discussed herein. However, in some examples, one or more other advantages, or no advantages may be provided by the currently disclosed subject matter in addition to or instead of acceleration, without detracting from the scope of the subject matter.

It will also be understood that the subject matter contemplates that a system or part of a system disclosed herein may be, comprised in a computer. Likewise, the subject matter contemplates, for example, a computer program being readable by a computer for executing a method or part of a method disclosed herein. Further contemplated by the subject matter, for example, is a non-transitory computer-readable medium tangibly embodying program code readable by a computer for executing a method or part of a method disclosed herein. The term "computer" should be expansively construed to cover any kind of electronic system which has data processing capabilities and which is made up of any combination of hardware, software and/or firmware that includes at least some hardware. Examples of such a computer include inter-alia: a personal computer, a server, a computing system, etc.

While examples of the subject matter have been shown and described, the subject matter is not thus limited. Numerous modifications, changes and improvements within the scope of the subject matter will now occur to the reader.

APPENDIX A

| No. | s | s1 | w1 | x1 | s2 | w2 | x2 | s3 | w3 | x3 |
|---|---|---|---|---|---|---|---|---|---|---|
| $1_{256}$ | 256 | 112 | 28 | 4 | 144 | 36 | 4 | N/A | N/A | N/A |
| $2_{256}$ | 256 | 88 | 22 | 4 | 168 | 42 | 4 | N/A | N/A | N/A |

APPENDIX A-continued

| No. | s | s1 | w1 | x1 | s2 | w2 | x2 | s3 | w3 | x3 |
|---|---|---|---|---|---|---|---|---|---|---|
| $3_{256}$ | 256 | 72 | 18 | 4 | 184 | 46 | 4 | N/A | N/A | N/A |
| $4_{256}$ | 256 | 44 | 22 | 2 | 212 | 106 | 2 | N/A | N/A | N/A |
| $5_{256}$ | 256 | 56 | 28 | 2 | 200 | 100 | 2 | N/A | N/A | N/A |
| $6_{256}$ | 256 | 80 | 40 | 2 | 176 | 88 | 2 | N/A | N/A | N/A |
| $7_{256}$ | 256 | 92 | 46 | 2 | 164 | 82 | 2 | N/A | N/A | N/A |
| $8_{256}$ | 256 | 116 | 58 | 2 | 140 | 70 | 2 | N/A | N/A | N/A |
| $9_{256}$ | 256 | 112 | 28 | 4 | 72 | 18 | 4 | 72 | 18 | 4 |
| $1_{512}$ | 512 | 224 | 28 | 8 | 288 | 36 | 8 | N/A | N/A | N/A |
| $2_{512}$ | 512 | 176 | 22 | 8 | 336 | 36 | 8 | N/A | N/A | N/A |
| $3_{512}$ | 512 | 144 | 18 | 8 | 368 | 46 | 8 | N/A | N/A | N/A |
| $4_{512}$ | 512 | 88 | 22 | 4 | 424 | 106 | 4 | N/A | N/A | N/A |
| $5_{512}$ | 512 | 112 | 28 | 4 | 400 | 100 | 4 | N/A | N/A | N/A |
| $6_{512}$ | 512 | 160 | 40 | 4 | 352 | 88 | 4 | N/A | N/A | N/A |
| $7_{512}$ | 512 | 184 | 46 | 4 | 328 | 82 | 4 | N/A | N/A | N/A |
| $8_{512}$ | 512 | 232 | 58 | 4 | 280 | 70 | 4 | N/A | N/A | N/A |
| $9_{512}$ | 512 | 224 | 28 | 8 | 144 | 18 | 8 | 144 | 18 | 8 |
| $1_{1024}$ | 1024 | 448 | 28 | 16 | 576 | 36 | 16 | N/A | N/A | N/A |
| $2_{1024}$ | 1024 | 352 | 22 | 16 | 672 | 36 | 16 | N/A | N/A | N/A |
| $3_{1024}$ | 1024 | 288 | 18 | 16 | 736 | 46 | 16 | N/A | N/A | N/A |
| $4_{1024}$ | 1024 | 176 | 22 | 8 | 848 | 106 | 8 | N/A | N/A | N/A |
| $5_{1024}$ | 1024 | 224 | 28 | 8 | 800 | 100 | 8 | N/A | N/A | N/A |
| $6_{1024}$ | 1024 | 320 | 40 | 8 | 704 | 88 | 8 | N/A | N/A | N/A |
| $7_{1024}$ | 1024 | 368 | 46 | 8 | 656 | 82 | 8 | N/A | N/A | N/A |
| $8_{1024}$ | 1024 | 464 | 58 | 8 | 560 | 70 | 8 | N/A | N/A | N/A |
| $9_{1024}$ | 1024 | 448 | 28 | 16 | 288 | 18 | 16 | 288 | 18 | 16 |
| $1_{2048}$ | 2048 | 896 | 28 | 32 | 1152 | 36 | 32 | N/A | N/A | N/A |
| $2_{2048}$ | 2048 | 704 | 22 | 32 | 1344 | 42 | 32 | N/A | N/A | N/A |
| $3_{2048}$ | 2048 | 576 | 18 | 32 | 1472 | 46 | 32 | N/A | N/A | N/A |
| $4_{2048}$ | 2048 | 352 | 22 | 16 | 1696 | 106 | 16 | N/A | N/A | N/A |
| $5_{2048}$ | 2048 | 448 | 28 | 16 | 1600 | 100 | 16 | N/A | N/A | N/A |
| $6_{2048}$ | 2048 | 640 | 40 | 16 | 1408 | 88 | 16 | N/A | N/A | N/A |
| $7_{2048}$ | 2048 | 736 | 46 | 16 | 1312 | 82 | 16 | N/A | N/A | N/A |
| $8_{2048}$ | 2048 | 928 | 58 | 16 | 1120 | 70 | 16 | N/A | N/A | N/A |
| $9_{2048}$ | 2048 | 896 | 28 | 32 | 576 | 18 | 32 | 576 | 18 | 32 |
| $1_{4096}$ | 4096 | 1792 | 28 | 64 | 2304 | 36 | 64 | N/A | N/A | N/A |
| $2_{4096}$ | 4096 | 1408 | 22 | 64 | 2688 | 42 | 64 | N/A | N/A | N/A |
| $3_{4096}$ | 4096 | 1152 | 18 | 64 | 2944 | 46 | 64 | N/A | N/A | N/A |
| $4_{4096}$ | 4096 | 704 | 22 | 32 | 3392 | 106 | 32 | N/A | N/A | N/A |
| $5_{4096}$ | 4096 | 896 | 28 | 32 | 3200 | 100 | 32 | N/A | N/A | N/A |
| $6_{4096}$ | 4096 | 1280 | 40 | 32 | 2816 | 88 | 32 | N/A | N/A | N/A |
| $7_{4096}$ | 4096 | 1472 | 46 | 32 | 2624 | 82 | 32 | N/A | N/A | N/A |
| $8_{4096}$ | 4096 | 1856 | 58 | 32 | 2240 | 70 | 32 | N/A | N/A | N/A |
| $9_{4096}$ | 4096 | 1792 | 28 | 64 | 1152 | 18 | 64 | 1152 | 18 | 64 |
| $1_{8192}$ | 8192 | 3584 | 28 | 128 | 4608 | 36 | 128 | N/A | N/A | N/A |
| $2_{8192}$ | 8192 | 2816 | 22 | 128 | 5376 | 42 | 128 | N/A | N/A | N/A |
| $3_{8192}$ | 8192 | 2304 | 18 | 128 | 5888 | 46 | 128 | N/A | N/A | N/A |
| $4_{8192}$ | 8192 | 1408 | 22 | 64 | 6784 | 106 | 64 | N/A | N/A | N/A |
| $5_{8192}$ | 8192 | 1792 | 28 | 64 | 6400 | 100 | 64 | N/A | N/A | N/A |
| $6_{8192}$ | 8192 | 2560 | 40 | 64 | 5632 | 88 | 64 | N/A | N/A | N/A |
| $7_{8192}$ | 8192 | 2944 | 46 | 64 | 5248 | 82 | 64 | N/A | N/A | N/A |
| $8_{8192}$ | 8192 | 3712 | 58 | 64 | 4480 | 70 | 64 | N/A | N/A | N/A |
| $9_{8192}$ | 8192 | 3584 | 28 | 128 | 2304 | 18 | 128 | 2304 | 18 | 128 |
| $1_{16384}$ | 16384 | 7168 | 28 | 256 | 9216 | 36 | 256 | N/A | N/A | N/A |
| $2_{16384}$ | 16384 | 5632 | 22 | 256 | 10752 | 42 | 256 | N/A | N/A | N/A |
| $3_{16384}$ | 16384 | 4608 | 18 | 256 | 11776 | 46 | 256 | N/A | N/A | N/A |
| $4_{16384}$ | 16384 | 2816 | 22 | 128 | 13568 | 106 | 128 | N/A | N/A | N/A |
| $5_{16384}$ | 16384 | 3584 | 28 | 128 | 12800 | 100 | 128 | N/A | N/A | N/A |
| $6_{16384}$ | 16384 | 5120 | 40 | 128 | 11264 | 88 | 128 | N/A | N/A | N/A |
| $7_{16384}$ | 16384 | 5888 | 46 | 128 | 10496 | 82 | 128 | N/A | N/A | N/A |
| $8_{16384}$ | 16384 | 7424 | 58 | 128 | 8960 | 70 | 128 | N/A | N/A | N/A |
| $9_{16384}$ | 16384 | 7168 | 28 | 256 | 4608 | 18 | 256 | 4608 | 18 | 256 |
| $1_{32768}$ | 32768 | 14336 | 28 | 512 | 18432 | 36 | 512 | N/A | N/A | N/A |
| $2_{32768}$ | 32768 | 11264 | 22 | 512 | 21504 | 42 | 512 | N/A | N/A | N/A |
| $3_{32768}$ | 32768 | 9216 | 18 | 512 | 23552 | 46 | 512 | N/A | N/A | N/A |
| $4_{32768}$ | 32768 | 5632 | 22 | 256 | 27136 | 106 | 256 | N/A | N/A | N/A |
| $5_{32768}$ | 32768 | 7168 | 28 | 256 | 25600 | 100 | 256 | N/A | N/A | N/A |
| $6_{32768}$ | 32768 | 10240 | 40 | 256 | 22528 | 88 | 256 | N/A | N/A | N/A |
| $7_{32768}$ | 32768 | 11776 | 46 | 256 | 20992 | 82 | 256 | N/A | N/A | N/A |
| $8_{32768}$ | 32768 | 14848 | 58 | 256 | 17920 | 70 | 256 | N/A | N/A | N/A |
| $9_{32768}$ | 32768 | 14336 | 28 | 512 | 9216 | 18 | 512 | 9216 | 18 | 512 |
| $1_{65536}$ | 65536 | 28672 | 28 | 1024 | 36864 | 36 | 1024 | N/A | N/A | N/A |
| $2_{65536}$ | 65536 | 22528 | 22 | 1024 | 43008 | 42 | 1024 | N/A | N/A | N/A |
| $3_{65536}$ | 65536 | 18432 | 18 | 1024 | 47104 | 46 | 1024 | N/A | N/A | N/A |
| $4_{65536}$ | 65536 | 11264 | 22 | 512 | 54272 | 106 | 512 | N/A | N/A | N/A |
| $5_{65536}$ | 65536 | 14336 | 28 | 512 | 51200 | 100 | 512 | N/A | N/A | N/A |
| $6_{65536}$ | 65536 | 20480 | 40 | 512 | 45056 | 88 | 512 | N/A | N/A | N/A |
| $7_{65536}$ | 65536 | 23552 | 46 | 512 | 41984 | 82 | 512 | N/A | N/A | N/A |
| $8_{65536}$ | 65536 | 29696 | 58 | 512 | 35840 | 70 | 512 | N/A | N/A | N/A |

APPENDIX A-continued

| No. | s | s1 | w1 | x1 | s2 | w2 | x2 | s3 | w3 | x3 |
|---|---|---|---|---|---|---|---|---|---|---|
| $9_{65536}$ | 65536 | 28672 | 58 | 1024 | 18432 | 18 | 1024 | 18432 | 18 | 1024 |
| $1_{131072}$ | 131072 | 57344 | 28 | 2048 | 73728 | 36 | 2048 | N/A | N/A | N/A |
| $2_{131072}$ | 131072 | 45056 | 22 | 2048 | 86016 | 42 | 2048 | N/A | N/A | N/A |
| $3_{131072}$ | 131072 | 36864 | 18 | 2048 | 94208 | 46 | 2048 | N/A | N/A | N/A |
| $4_{131072}$ | 131072 | 22528 | 22 | 1024 | 108544 | 106 | 1024 | N/A | N/A | N/A |
| $5_{131072}$ | 131072 | 28672 | 28 | 1024 | 102400 | 100 | 1024 | N/A | N/A | N/A |
| $6_{131072}$ | 131072 | 40960 | 40 | 1024 | 90112 | 88 | 1024 | N/A | N/A | N/A |
| $7_{131072}$ | 131072 | 47104 | 46 | 1024 | 83968 | 82 | 1024 | N/A | N/A | N/A |
| $8_{131072}$ | 131072 | 59392 | 58 | 1024 | 71680 | 70 | 1024 | N/A | N/A | N/A |
| $9_{131072}$ | 131072 | 57344 | 58 | 2048 | 36864 | 18 | 2048 | 36864 | 18 | 2048 |

The invention claimed is:

1. A system, comprising:
a Redundant Array of Independent Disks, RAID, controller capable of logically partitioning a stripe into two or more sub-stripes, and of applying to each of said two or more sub-stripes, two or more RAID erasure codes for at least encoding and decoding;
wherein for each given sub-stripe of said two or more sub-stripes, said two or more RAID erasure codes are applied based on data within said given sub-stripe, and independently of data in any other of said two or more sub-stripes.

2. The system of claim 1, further comprising:
a plurality of storage devices;
wherein said RAID controller is capable of writing or reading said stripe to or from any of said plurality of storage devices.

3. The system of claim 1, wherein each sub-segment associated with a same sub-stripe has identical size.

4. The system of claim 1, wherein a size of a sub-segment associated with one of said sub-stripes differs from a size of a sub-segment associated with another of said sub-stripes.

5. The system of claim 1, wherein two sub-segments associated with two different sub-stripes have identical size.

6. The system of claim 1, wherein at least one selected from a group comprising: number of packets or size of packets, differs for different sub-stripes.

7. The system of claim 1, wherein at least one selected from a group comprising: number of packets or size of packets, is identical for at least two different sub-stripes.

8. The system of claim 1, wherein a size of a sub-segment associated with a sub-stripe does not equal a power of two.

9. The system of claim 1, wherein a size of a sub-segment associated with a sub-stripe equals a power of two.

10. The system of claim 1, wherein said RAID controller is capable of determining values of packet size and number of packets to use per sub-stripe.

11. The system of claim 10, wherein said RAID controller is configured for determining values of packet size and number of packets to use per sub-stripe to: select from among available sets, each set including: values for any of packet size, number of packets, or sub-segment size per sub-stripe;
wherein the selection is at least partly based on at least one factor selected from a group comprising:
segment size in stripe, type of two or more RAID erasure codes, number of data segments in stripe, testing data relating to acceleration of RAID erasure code application, in-turn selection, or random selection.

12. The system of claim 10, wherein only one set is available for selection by the RAID controller; the one set including values for any of: packet size, number of packets, or sub-segment size per sub-stripe: and wherein said RAID controller is configured for determining values of packet size and number of packets to use per sub-stripe, to determine to use said set.

13. The system of claim 10, wherein said RAID controller being capable of determining values of packet size and number of packets to use per sub-stripe includes said RAID controller being capable of deriving a value of packet size or sub-segment size to use per sub-stripe from an available set corresponding to a different segment size than segment size of said stripe.

14. The system of claim 10, being capable of determining values of packet size and number of packets to use per sub-stripe, includes said RAID controller being capable of computing a value for packet size or number of packets from an available set which includes values for sub-segment size and number of packets or packet size respectively.

15. The system of claim 10, wherein said RAID controller being capable of determining values of packet size and number of packets to use per sub-stripe includes said RAID controller being capable of determining values to use for decoding at least partly based on values which were used for encoding.

16. The system of claim 1, wherein said RAID controller is capable of determining at least one possible set including values for any of packet size, number of packets, or sub-segment size per sub-stripe which complies with at least one predetermined constraint.

17. The system of claim 16, wherein said at least one predetermined constraint is selected from a group comprising: number of packets per sub-segment of sub-stripe is greater than or equal to number of data segments, number of packets per sub-segment of sub-stripe is greater than or equal to number of data segments minus 1, number of packets per sub-segment of sub-stripe is equal to a prime number minus 1, packet size per sub-stripe is equal to a power of 2, or sum of sub-stripe sub-segment sizes is equal to stripe segment size.

18. The system of claim 1, wherein said RAID controller being capable of applying at least one RAID erasure code includes said RAID controller being capable of encoding said sub-stripe in order to compute two or more parity sub-segments.

19. The system of claim 1, wherein said RAID controller being capable of applying two or more RAID erasure codes includes said RAID controller being capable of decoding two or more parity sub-segments in said sub-stripe.

20. The system of claim 1, wherein said RAID controller being capable of applying two or more RAID erasure codes includes said RAID controller being capable of applying different RAID erasure codes to different ones of said sub-stripes.

21. A method performed by a Redundant Array of Independent Disks, RAID, controller, comprising:
  logically partitioning a stripe into two or more sub-stripes, and applying to each of said two or more sub-stripes, two or more RAID erasure codes for at least encoding and decoding;
    wherein for each given sub-stripe of said two or more sub-stripes, said two or more RAID erasure codes are applied based on data within said given sub-stripe, and independently of data in any other of said two or more sub-stripes.

22. The method of claim 21, wherein said applying includes encoding said sub-stripe in order to compute two or more parity sub-segments.

23. The method of claim 21, wherein said applying includes decoding two or more parity sub-segments in said sub-stripe.

24. The method of claim 21, further comprising: determining values of packet size and number of packets to use per sub-stripe.

25. The method of claim 21, further comprising: determining at least one possible set including values for any of packet size, number of packets or sub-segment size per sub-stripe which complies with at least one predetermined constraint.

26. The method of claim 21, further comprising: reading said stripe from storage devices prior to said partitioning.

27. The method of claim 21, further comprising: writing said stripe to storage devices after said applying.

28. A computer program product comprising a non-transitory computer readable medium having Redundant Array of Independent Disks, RAID computer readable program code embodied therein the computer program product comprising:
  computer readable program code for causing a computer to logically partition a stripe into two or more sub-stripes, and
  computer readable program code for causing a computer to apply to each of said two or more sub-stripes, two or more RAID erasure codes for at least encoding and decoding;
    wherein for each given sub-stripe of said two or more sub-stripes, said two or more RAID erasure codes are applied based on data within said given sub-stripe, and independently of data in any other of said two or more sub-stripes.

* * * * *